(12) United States Patent
Sheppard et al.

(10) Patent No.: US 7,313,811 B1
(45) Date of Patent: Dec. 25, 2007

(54) OPTICAL CONVERSION DEVICE

(75) Inventors: Steve Sheppard, Sebastopol, CA (US);
A. J. McInnis, Santa Rosa, CA (US);
Charles Eldering, Doylestown, PA
(US); Thomas Eames, Penngrove, CA
(US)

(73) Assignee: General Instrument Corporation,
Horsham, PA (US)

( * ) Notice: Subject to any disclaimer, the term of this patent is extended or adjusted under 35 U.S.C. 154(b) by 0 days.

(21) Appl. No.: 09/526,100

(22) Filed: Mar. 15, 2000

Related U.S. Application Data (63) Continuation of application No. 09/026,036, filed on Feb. 19, 1998, now Pat. No. 6,317,884.

(60) Provisional application No. 60/038,276, filed on Feb. 19, 1997.

(51) Int. Cl.
| | |
|---|---|
| H04N 7/16 | (2006.01) |
| H04N 7/173 | (2006.01) |
| H04N 7/18 | (2006.01) |
| H04B 10/00 | (2006.01) |
| G08C 19/00 | (2006.01) |

(52) U.S. Cl. .................. 725/143; 725/78; 725/80; 725/85; 725/133; 725/141; 725/153; 398/115; 340/825.57

(58) Field of Classification Search .................. 725/74, 725/78, 80, 81, 82, 85, 131, 133, 139, 141, 725/151, 153; 398/115, 116, 127, 70; 379/56.2, 379/56.3; 348/734; 340/825.57, 825.72, 340/825.73; 359/142
See application file for complete search history.

(56) References Cited

U.S. PATENT DOCUMENTS

| | | | | |
|---|---|---|---|---|
| 4,739,406 | A * | 4/1988 | Morton et al. | 348/578 |
| 5,483,277 | A * | 1/1996 | Granger | 725/120 |
| 5,500,691 | A * | 3/1996 | Martin et al. | 348/734 |
| 5,515,511 | A * | 5/1996 | Nguyen et al. | 725/117 |
| 5,521,631 | A * | 5/1996 | Budow et al. | 725/78 |
| 5,574,964 | A * | 11/1996 | Hamlin | 725/78 |

(Continued)

FOREIGN PATENT DOCUMENTS

WO          9739483          8/1997

OTHER PUBLICATIONS

Webster's New World Dictionary, Published by Webster's New World Dictionaries, Third College Edition, 1988, p. 188.*

(Continued)

*Primary Examiner*—Chris Kelley
*Assistant Examiner*—Joseph G Ustaris
(74) *Attorney, Agent, or Firm*—Benjamin D. Driscoll (57) ABSTRACT

A residential gateway (RG) for distributing video, data and telephony services to multiple devices within a residence is disclosed. The RG receives signals from a telecommunications network, converts the signals to formats compatible with the multiple devices, and transmits the appropriate signals to the appropriate devices. Optical Remote Control devices (RCs) associated with remotely located televisions (TVs) transmit channel select commands to the RG as optical signals. The optical signals are received by an optical receiver located in close proximity to the remotely located TVs. The optical signal is then converted to an RF signal by an RF transmitter which transmits the RF signal over coaxial cable. A Remote Antennae Module (RAM) extracts the channel select command from the RF signal and provides it to the RG.

7 Claims, 10 Drawing Sheets

U.S. PATENT DOCUMENTS

| | | | | |
|---|---|---|---|---|
| 5,610,916 | A | | 3/1997 | Kostreski et al. ............. 370/69 |
| 5,613,190 | A | | 3/1997 | Hylton ....................... 455/3.1 |
| 5,613,191 | A | | 3/1997 | Hylton et al. ................ 455/3.1 |
| 5,628,055 | A | | 5/1997 | Stein ........................... 455/89 |
| 5,630,204 | A | | 5/1997 | Hylton et al. ................ 455/3.3 |
| 5,640,453 | A | * | 6/1997 | Schuchman et al. ........ 380/211 |
| 5,651,010 | A | | 7/1997 | Kostreski et al. ............. 370/50 |
| 5,659,353 | A | | 8/1997 | Kostreski et al. ............. 348/21 |
| 5,701,152 | A | | 12/1997 | Chen ............................ 455/2 |
| 5,708,961 | A | | 1/1998 | Hylton et al. .................. 348/6 |
| 5,715,020 | A | | 2/1998 | Kuroiwa et al. ............ 348/734 |
| 5,729,279 | A | | 3/1998 | Fuller ........................ 348/384 |
| 5,793,413 | A | | 8/1998 | Hylton et al. ................ 348/12 |
| 5,812,184 | A | * | 9/1998 | Martinez .................... 725/131 |
| 5,828,403 | A | * | 10/1998 | DeRodeff et al. ........... 725/131 |
| 5,842,111 | A | | 11/1998 | Byers .......................... 348/10 |
| 5,901,340 | A | * | 5/1999 | Flickinger et al. .......... 725/149 |
| 5,917,624 | A | | 6/1999 | Wagner ...................... 359/125 |
| 5,933,192 | A | | 8/1999 | Crosby et al. ................ 348/10 |
| 5,936,660 | A | | 8/1999 | Gurantz ...................... 348/734 |
| 5,953,045 | A | | 9/1999 | Tanishima ................... 348/10 |
| 6,208,384 | B1 | * | 3/2001 | Schultheiss ................. 348/552 |
| 6,286,142 | B1 | * | 9/2001 | Ehreth ......................... 725/78 |
| 6,317,884 | B1 | * | 11/2001 | Eames et al. ............... 709/217 |
| 6,493,875 | B1 | * | 12/2002 | Eames et al. ................. 725/81 |
| 2003/0192053 | A1 | * | 10/2003 | Sheppard et al. |

OTHER PUBLICATIONS

Residential Gateway Group publication, "The residential gateway", Oct. 1995, 8 pp.
Generic Requirement, Bellcore, "Active Network Interface Device (Residential Gateway)," GR-2890-CORE, issue 2, Nov. 1996, 19 pp.
Specifications, GTE, "The residential gateway functional specifications," printed from the World Wide Web site http://info.gte.com/gtel/sponsored/rg/webspec.htm on Jul. 24, 1996, 6 pp.
Co-pending U.S. Appl. No. 09/525,412, filed Mar. 15, 2000.
Co-pending U.S. Appl. No. 09/525,488, filed Mar. 15, 2000.
Co-pending U.S. Appl. No. 09/488,275, filed Jan. 20, 2000.
Co-pending U.S. Appl. No. 09/026,038, filed Feb. 19, 1998.
Co-pending Related U.S. Appl. No. 09/612,562, Title : Wireless and xDSL Residential Gateway and System, filed Jul. 7, 2000.

* cited by examiner

OPTICAL CONVERSION DEVICE

This application is a Continuation-in-Part (CIP) and claims the benefit under 35 U.S.C. §120 of Continuing Prosecution Application (CPA) Ser. No. 09/026,036 filed on Oct. 12, 1999, which was a Continuation of U.S. patent application Ser. No. 09/026,036 entitled "Video Data and Telephone Gateway" filed on Feb. 19, 1998 now U.S. Pat. No. 6,317,884, which claimed the priority of U.S. Provisional Patent Application No. 60/038,276 filed on Feb. 19, 1997. Application Ser. Nos. 09/026,036 and 60/038,276 are incorporated herein by reference, but are not admitted to be prior art.

FIELD OF THE INVENTION

The present invention relates to an apparatus and method for the distribution of video, data, telephone and other telecommunications services from a single point to multiple devices within a residence.

BACKGROUND OF THE INVENTION

Advances in the field of telecommunications allow large amounts of digital information to be delivered to a residence. Digital telecommunications networks (access systems), such as Hybrid-Fiber-Coax (HFC), Fiber-to-the-Curb (FTTC), and Digital Subscriber Line (DSL), can provide both traditional telecommunications services such as Plain Old Telephone Service (POTS) as well as advanced services such as Switched Digital Video (SDV) and high-speed data access. Devices inside the residence, will be connected to the network by twisted wire pairs which provide telephone services today, or by coaxial cable similar to that used by cable operators to provide cable television (TV) services. Because of this range of services, it is likely that digital networks will be widely deployed. In a widespread deployment of digital networks, millions of homes will connect to the digital networks.

Because the majority of new video services will be digital, and because existing TVs are analog, there is a need for a device, hereinafter referred to as a Residential Gateway (RG), to convert the digital signals supplied by the network to analog signals compatible with existing TVs. Furthermore, there is a need for the RG to act as an interface subsystem for each device connected to the digital network. For example, the RG needs to act as a Premises Interface Device (PID) to extract time division multiplexed information and generate a telephone signal, and a Ethernet Bridge or Router (EBR) to generate a signal compatible with a computer.

Transmission of channel select commands associated with remotely located TVs may encounter problems related to the distance to the RG and possible obstacles therebetween. Thus, there is a need for a method and apparatus for ensuring the RG receives the channel select commands from remotely located TVs.

SUMMARY OF THE INVENTION

The present invention discloses a method and an apparatus for receiving signals from a telecommunications network, decoding the signals, and transmitting the decoded signals to a plurality of devices. In a preferred embodiment the telecommunications network is a digital network and the signals include video signals, and may possibly include telephone signals, computer signals, and signals for other devices. In a preferred embodiment the plurality of devices includes multiple televisions (TVs) and may possibly include telephones, computers and other devices. The apparatus is commonly known as a residential gateway (RG).

According to one embodiment, a method of receiving, decoding and distributing video signals from a telecommunications network to a plurality of TVs locatable in at least two separate locations via a RG is disclosed. The method includes receiving channel select commands from remote control devices associated with the plurality of TVs, wherein at least a first channel select command is received directly by a receiver within the RG. A video signal is received from the telecommunications network and transported over a video bus to a video processor. The video processor processes the video signal to produce TV signals corresponding to the channel select commands. The TV signals are transmitted to the respective TVs.

According to one embodiment, a RG for distributing video signals to a plurality of TVs locatable within at least two separate locations is disclosed. The RG includes a receiver for directly receiving a first channel select command from a first remote control device associated with a first TV. A remote control processor processes channel select commands. A network interface module receives signals, including video signals, from a telecommunications network, wherein the received video signals correspond to the channel select commands. A video processor processes the received video signals to produce TV signals. A video bus transports the received video signals to the video processor.

According to one embodiment, a method for receiving and decoding signals from a telecommunications network at a RG, and transmitting decoded signals from the RG to a plurality of devices including multiple TVs is disclosed. The method includes connecting each of the plurality of devices and the telecommunications network to the RG so that all communications between the devices and the telecommunications network must pass through the RG. TV channels to view for the multiple TVs are selected by programming associated remote control devices to transmit channel select commands, wherein a first channel select command is received by a receiver within the RG. The channel select commands are transported to a network interface module over a first bus. The channel select commands are then transmitted from the network interface module to the telecommunications network. Video signals are received from the telecommunications network at the network interface module. The video signals are transported to a video processor over a second bus. The video signal is processed into TV signals corresponding to the channel select commands. The TV signals are then transmitted to the corresponding TVs.

According to one embodiment, a method for receiving signals from a telecommunications network, decoding the signals and transmitting the decoded signals from a RG to a plurality of devices including multiple TVs is disclosed. The method includes connecting the RG to the telecommunications network and to at least one TV that is remotely located from the RG. A TV channel to view for the at least one TV is selected by programming associated optical remote control devices, wherein the optical remote control devices transmit channel select commands as optical signals to optical conversion devices connected to the at least one TV. The optical conversion devices receive the optical signals, convert the optical signals to RF signals and transmit the RF signals over media to a media interface device which demodulates the RF signals and extracts the portion corresponding to the channel select commands. The channel select commands are then transmitted to the telecommunications network. A video signal is received from the telecommunications network. The video signal is processed by a video processor to produce TV signals corresponding to the channel select commands. The TV signals are then transmitted to the at least one TV.

According to one embodiment, a RG for receiving and decoding signals from a telecommunications network and transmitting the decoded signals to a plurality of devices including multiple TVs is disclosed. The RG includes a network interface module for transmitting upstream signals, including channel select commands, to the telecommunications network and receiving downstream signals, including video signals, from the telecommunications network. A video processor processes the video signals into at least one TV signal corresponding to at least one channel select command, and transmits the at least one TV signal to the corresponding TV. A remote control module processes the channel select commands, wherein at least one of the channel select commands is extracted from a RF signal, the RF signal being generated by an optical conversion device in response to an optical signal transmitted from an optical remote control device to the optical conversion device connected to the associated TV. The optical conversion device transmits the RF signal over cable to a remote antennae module which demodulates the RF signal and extracts the portion corresponding to the channel select command.

According to one embodiment, a RG for receiving and decoding signals from a telecommunications network and transmitting the decoded signals to a plurality of devices including multiple TVs is disclosed. The RG includes a network interface module for transmitting upstream signals, including channel select commands, to the telecommunications network and receiving downstream signals, including video signals, from the telecommunications network. A video processor decodes the video signals into TV signals corresponding to channel select commands, and transmits the TV signals to the corresponding TVs. An optical conversion device located in close proximity to and connected to a remotely located TV, receives an optical signal, including a channel select command, from an optical remote control device associated with the remotely located TV, converts the optical signal to an RF signal, and modulates the RF signal over media. A media interface device connected to the media and the RG for demodulating the RF signal, extracting the portion corresponding to the channel select command, and transmitting the channel select command to the RG.

According to one embodiment, an optical conversion device for receiving optical signals, converting the optical signals to RF signals, and transmitting the RF signals over media is disclosed. The optical conversion device includes an optical receiver for detecting the optical signal and generating a corresponding pulse train. A bias switch connected to said optical receiver turns on and off in response to the pulse train. An oscillator connected to said bias switch produces a modulated RF signal, the modulated RF signal being produced by the oscillator turning on and off in response to the bias switch. A diplexer filter directionally injects the RF signal onto the media.

According to one embodiment, an optical conversion device for receiving optical signals representing channel select commands from an optical remote control device associated with a TV, converting the optical signal to an RF signal, and transmitting the RF signal over media to a RG is disclosed. The optical conversion device includes an optical conversion device for receiving optical signals, converting the optical signals to RF signals, and transmitting the RF signals over media is disclosed. The optical conversion device includes an optical receiver for detecting the optical signal and generating a corresponding pulse train. A bias switch connected to said optical receiver turns on and off in response to the pulse train. An oscillator connected to said bias switch produces a modulated RF signal, the modulated RF signal being produced by the oscillator turning on and off in response to the bias switch. A diplexer filter directionally injects the RF signal onto the media.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 9 in particular, the method and apparatus of the present invention are disclosed.

Figure 1:
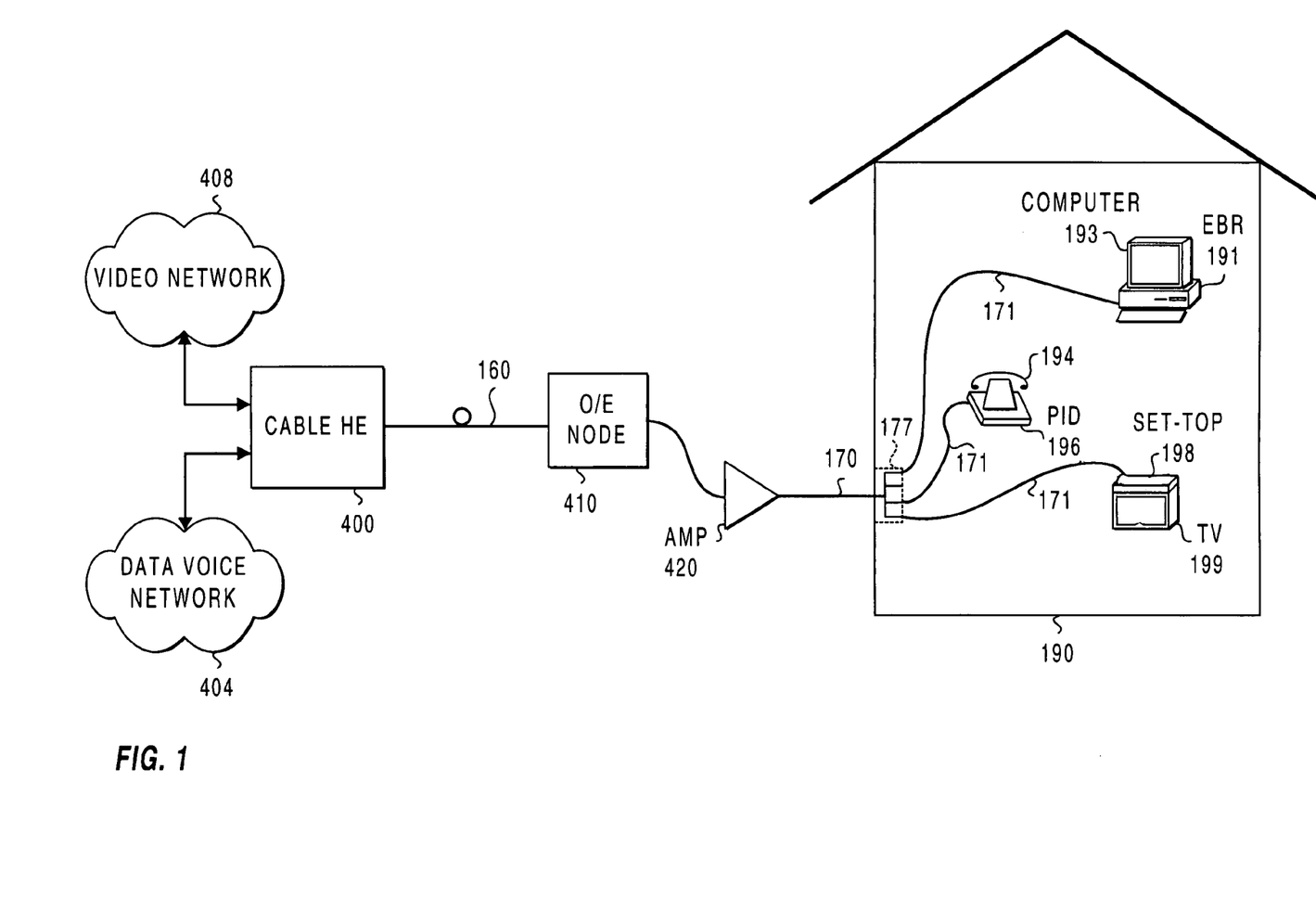
FIG. 1 illustrates a Hybrid-Fiber-Coax (HFC) access system.

FIG. 1 illustrates a Hybrid-Fiber-Coax (HFC) digital network in which various devices within a residence 190 are connected to a Video Network (VN) 408 and/or a Data and Voice Network (DVN) 404. The devices in the residence 190 can include a Premises Interface Device (PID) 196 connected to a telephone 194, a television (TV) set-top converter 198 connected to a TV 199, an Ethernet Bridge or Router (EBR) 191 connected to a computer 193, or other devices. A cable Head End (HE) 400 is connected upstream to the DVN 404 and the VN 408. The physical interface to the DVN 404 may be copper wire pairs carrying either DS-1 or DS-3 signals. The physical interface to the VN 408 may be via a wide area network (WAN).

The cable HE 400 is connected downstream to a plurality of optical to electrical (O/E) nodes 410 (only one illustrated) with fiber optic cables 160. The O/E nodes 410 are located within the communities serviced by the HFC network. Each O/E node 410 provides service for up to 500 residences within the given community. Since such a large number of users are being serviced by one O/E node 410, amplifiers 420 are required. The O/E node 410 connects to the residence 190 via coaxial cable 170. The coaxial cable 170 is received by a splitter 177 within the residence 190 so that internal coaxial wiring 171 can route the data being transmitted to the various devices. Each device connected to the internal coaxial wiring 171 will require an interface subsystem which can convert the current format of the signal being transmitted over the internal coaxial wiring 171 to the service interface required by the devices (i.e., telephone, TV, computer, or other devices). In a preferred embodiment, the PID 196 extracts time division multiplexed information carried on the internal coaxial wiring and generates a telephone signal compatible with the telephone 194. Similarly, the TV set-top 198 converts digital video signals to analog signals compatible with the TV 199. Likewise, the NIC 191 generates a signal compatible with the computer 193.

Figure 2:
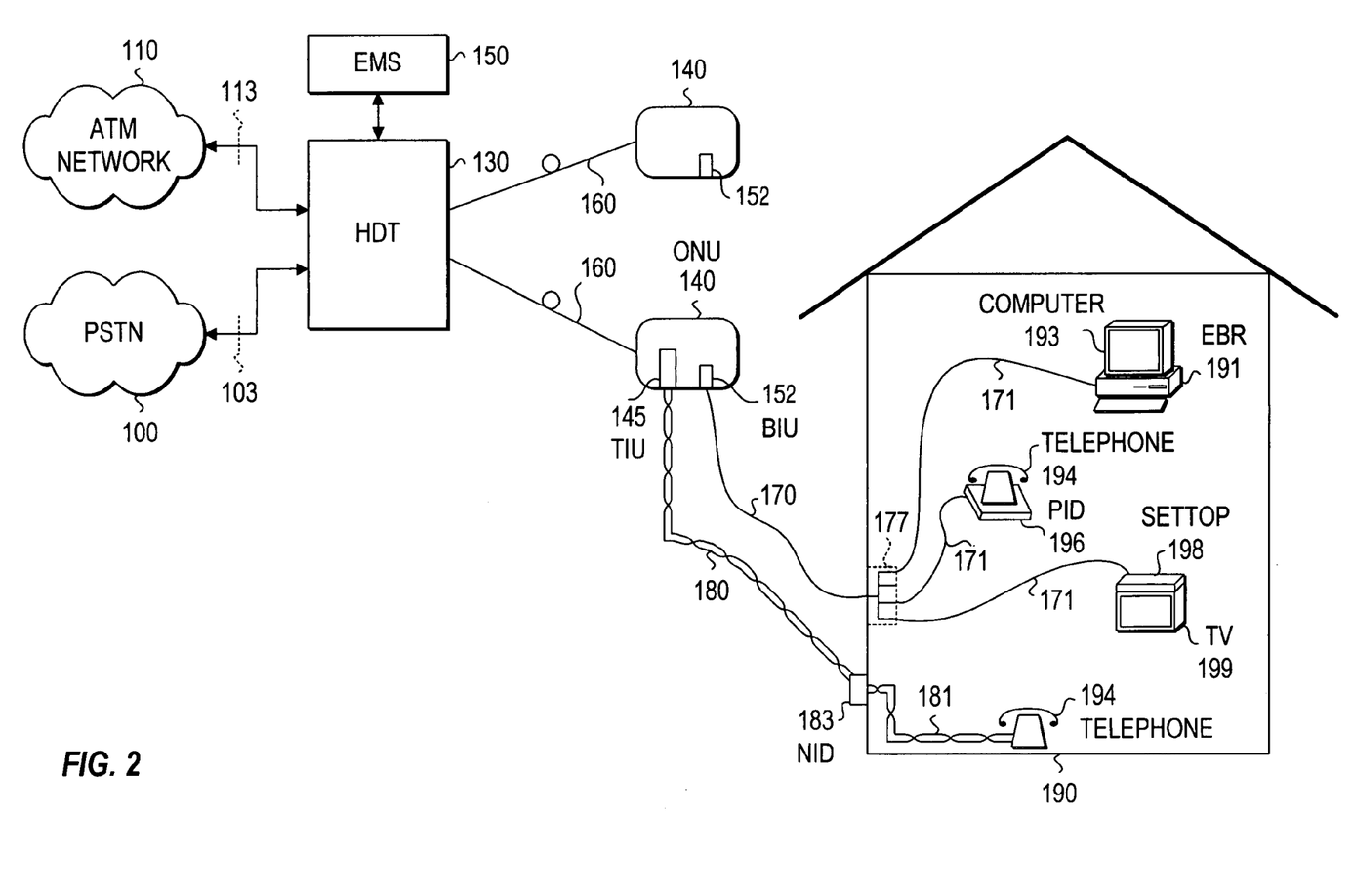
FIG. 2 illustrates a Fiber-To-The-Curb (FTTC) access system.

FIG. 2 illustrates a Fiber-to-the-Curb (FTTC) network in which various devices in the residence 190 are connected to a Public Switched Telecommunications Network (PSTN) 100 or an Asynchronous Transfer Mode (ATM) network 110. The devices in the residence 190 can include telephones 194 (with or without a PID 196), TV 199 with a TV set-top 198, and computer 193 with an EBR 191. In the FTTC network, a Host Digital Terminal (HDT) 130 is connected to the PSTN 100 and the ATM network 110.

A PSTN-HDT interface 103 is specified by standards bodies, such as Bellcore specifications TR-TSY-000008, TR-NWT-000057 or GR-NWT-000303. The Bellcore standards are incorporated herein by reference. The HDT 130 can also receive special service signals from private or non-switched public networks. The physical interface to the PSTN 100 may be twisted wire pairs carrying DS-1 signals, or optical fibers carrying Optical Carrier (OC)-3 optical signals. An ATM network-HDT interface 113 can be realized using an OC-3 or OC-12c optical interface carrying ATM cells. In a preferred embodiment, the HDT 130 has three OC-12c broadcast ports, which receive signals carrying ATM cells, and one OC-12c interactive port which receives and transmits signals.

Ah element management system (EMS) 150 is connected to the HDT 130 and forms part of an Element Management Layer (EML) which is used to provision services and equipment on the FTTC network, in the central office where the HDT 130 is located, in the field, or in the residences 190. The EMS 150 is software based and can be run on a personal computer in which case it will support one HDT 130 and the associated digital network equipment connected to it, or can be run on a workstation to support multiple HDTs 130 and the associated digital network equipment.

Optical Network Units (ONUs) 140 are located in the serving area and are connected to the HDT 130 via optical fiber 160. Digital signals, having a format which is similar to the Synchronous Digital Hierarchy (SDH) format, are transmitted to and from each ONU 140 over the optical fiber 160 at a rate of at least 155 Mb/s, and preferably 622 Mb/s. In a preferred embodiment, the optical fiber 160 is a single-mode fiber and a dual wavelength transmission scheme is used to communicate between the ONU 140 and the HDT 130. In an alternate embodiment, a single wavelength scheme is used in which low reflectivity components are used to permit transmission and reception on one fiber.

A Telephony Interface Unit (TIU) 145 in the ONU 140 generates analog Plain Old Telephone Service (POTS) signals which are transported to the residence 190 via a twisted wire pair, drop line cable 180. At the residence 190 a Network Interface Device (NID) 183 provides for high-voltage protection and serves as the interface and demarcation point between the twisted wire pair, drop line cable 180 and the twisted wire pairs 181 internal to the residence 190. In a preferred embodiment, the TIU 145 generates POTs signals for six residences 190, each having a separate twisted wire pair, drop line cable 180 connected to the ONU 140.

A Broadband Interface Unit (BIU) 152 is located in the ONU 140 and generates broadband signals which contain video, data and voice information. The BIU 152 modulates data onto a RF carrier and transmits the data to the residence 190 over media 170, such as a coaxial, drop line cable or a twisted wire pair, drop line cable. The media 170 connects to the residence 190 at a splitter 177. The data then travels from the splitter 177 to the devices within the residence 190 over coaxial wiring 171 internal to the residence 190. Each device connected to the internal coaxial wiring 171 will require an interface sub-system which can convert the current format of the signal being transmitted over the internal coaxial wiring 171 to the service interface required by the devices (i.e., telephone 194, TV 199, computer 193, or other devices).

In a preferred embodiment, 64 ONUs 140 are served by each HDT 130 and each ONU 140 serves 8 residences 190. In an alternate embodiment, each ONU 140 serves 16 residences 190.

As illustrated in FIG. 2, the NID 183 is located external to the residence 190, at what is known in the industry as the network demarcation point. For the delivery of telephone services the NID 183 is a passive device whose principal functions are lightning protection and the ability to troubleshoot the network by allowing connection of a telephone 194 to the twisted wire pair, drop line cable 180 to determine if wiring problems exist on the internal twisted wire pairs 181.

Figure 3:
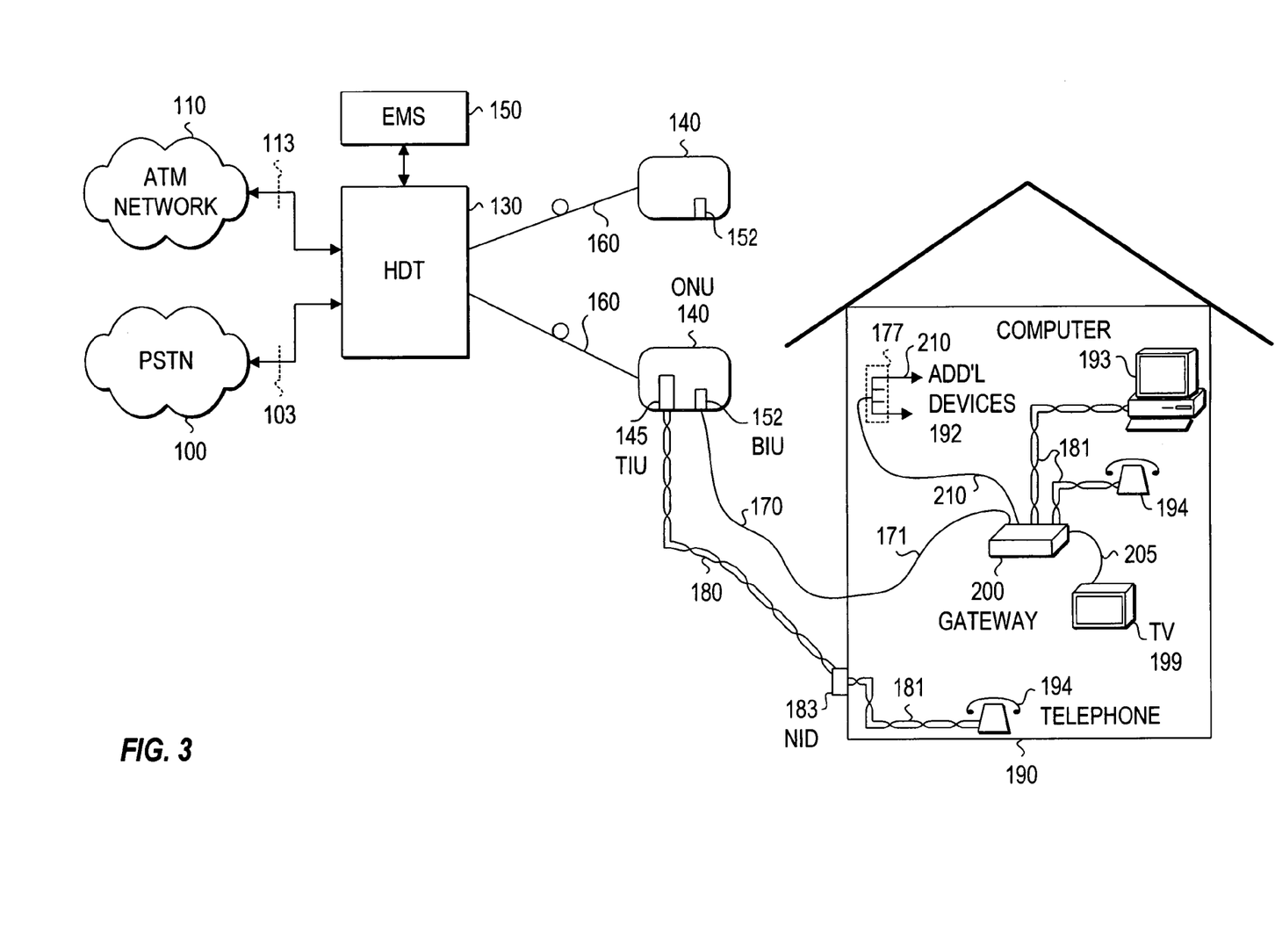
FIG. 3 illustrates an FTTC access system including a Residential Gateway (RG), according to one embodiment.

FIG. 3 illustrates a residential gateway (RG) 200 located within the residence 190. In the embodiment illustrated, the digital network is an FTTC network and the media 170 is a coaxial, drop line cable for connecting to and communicating with the RG 200. The RG 200 generates signals compatible with the devices (i.e., telephone 194, TV 199, and the computer 193) in the residence 190, thus reducing the number of interface sub-systems required. For example, the computer 193 does not need the NIC 191, the telephone 194 does not need the PID 196, and the TVs 199 do not require the set-top converters 198. Moreover, in a preferred embodiment, the RG 200 can produce TV signals as S-video signals and transmit the S-video signals to a TV 199 located in close proximity to the RG 200 using S-video cables 205.

Additional devices 192, such as additional TVs 199, which are remotely located from the RG 200 (hereinafter referred to as remotely located TVs 199) may be connected to the RG 200. In one embodiment, each of the remotely located TVs 199 may be connected to the RG 200 via media 210, such as internal coaxial cable, and the splitter 177 (this type of connection is known as a point-to-multipoint connection). In another embodiment, each remotely located TV 199 may be directly connected to the RG 200 with the media 210 (this type of connection is known as a point-to-point connection).

Figure 4:
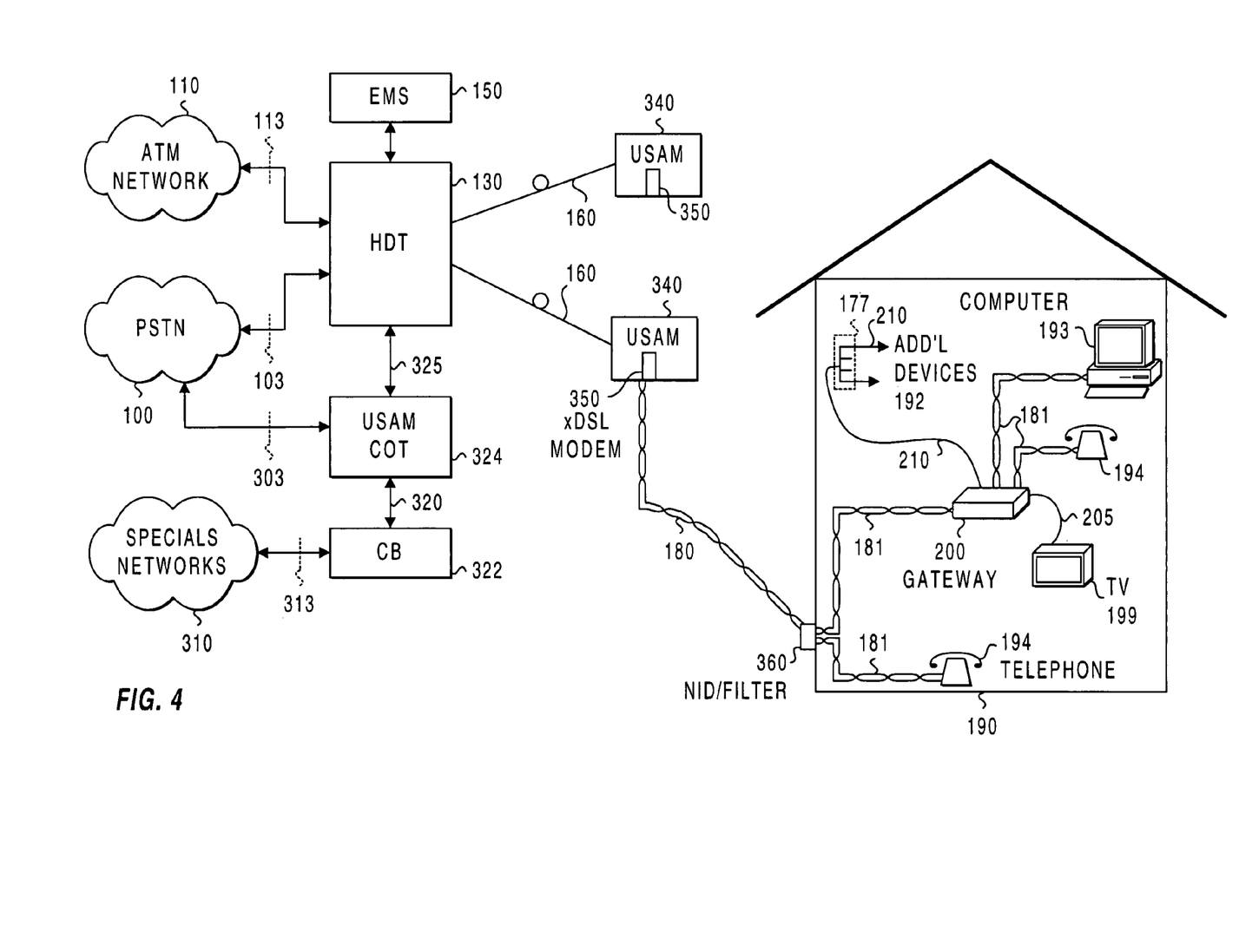
FIG. 4 illustrates a Digital Subscriber Line (DSL) access system including an RG, according to one embodiment.

FIG. 4 illustrates an embodiment, in which the digital network is a Digital Subscriber Line (DSL) network. In this embodiment, the DSL network replaces the ONU 140 with a Universal Service Access Multiplexer (USAM) 340. The USAM 340 is located in the serving area, and is connected to the HDT 130 via optical fiber 160. A twisted wire pair, drop line cable 180 provides communications to and from the RG 200.

The USAM 340 includes a xDSL modem 350 which provides for the transmission of high-speed digital data to and from the residence 190, over the twisted wire pair, drop line cable 180. When used herein, the term xDSL refers to any one of the twisted wire pair digital subscriber loop transmission techniques including High speed Digital Subscriber Loop (HDSL), Asymmetric Digital Subscriber Loop (ADSL), Very high speed Digital Subscriber Loop (VDSL), Rate Adaptive Digital Subscriber Loop (RADSL), or other similar twisted wire pair transmission techniques. Such transmission techniques are known to those skilled in the art. The xDSL modem 350 contains the circuitry and software to generate a signal which can be transmitted over the twisted wire pair, drop line cable 180, and which can receive high speed digital signals transmitted from the RG 200 or other devices connected to the subscriber network.

Traditional analog telephone signals are combined with the digital signals for transmission to the residence 190. A NID/filter 360 replaces the NID 183 of FIGS. 2 and 3, and is used to separate the analog telephone signals from the digital signals. The majority of xDSL transmission techniques leave the analog voice portion of the spectrum (from approximately 400 Hz to 4,000 Hz) undisturbed. The analog telephone signal, once separated from any digital data signals in the spectrum, is sent to the telephone 194 over the internal twisted wire pairs 181. The digital signals that are separated at the NID/filter 360 are sent from a separate port on the NID/filter 360 to the RG 200. The RG 200 serves as the interface to the other devices (TVs 199, computers 193, and additional telephones 194) in the residence 190.

The embodiment illustrated in FIG. 4 is a central office configuration, which includes a USAM Central Office Terminal (COT) 324 connected to the HDT 130. A USAM COT-HDT connection 325, is a twisted wire pair which transmits a STS3c signal in a preferred embodiment. A PSTN-USAM COT interface 303 is one of the Bellcore specified interfaces including TR-TSY-000008, TR-NWT-000057 or TR-NWT-000303, which are all incorporated herein by reference. The USAM COT 324 has the same mechanical configuration as the USAM 340 in terms of power supplies and common control cards, but has line cards which support twisted wire pair interfaces to the PSTN 100 (including DS-1 interfaces) and cards which support STS3c transmission over the twisted wire pair of the USAM COT-HDT connection 325.

A Channel Bank (CB) 322 is used to connect special networks 310, comprised of signals from special private or public networks, to the DSL network via a special networks-CB interface 313. In a preferred embodiment, a CB-USAM COT connection 320 includes DS1 signals over twisted wire pairs.

The RG 200 of FIGS. 3 and 4 can be located anywhere within the residence 190 (i.e., in any of the living spaces, in the basement, in the garage, in a wiring closet, in the attic), or external to the residence (i.e., on an external wall). For external locations, the RG 200 will require a hardened enclosure and components which work over a larger temperature range than those used for the RG 200 located internal to the residence 190. Techniques for developing hardened enclosures and selecting temperature tolerant components are known to those skilled in the art.

Figure 5:
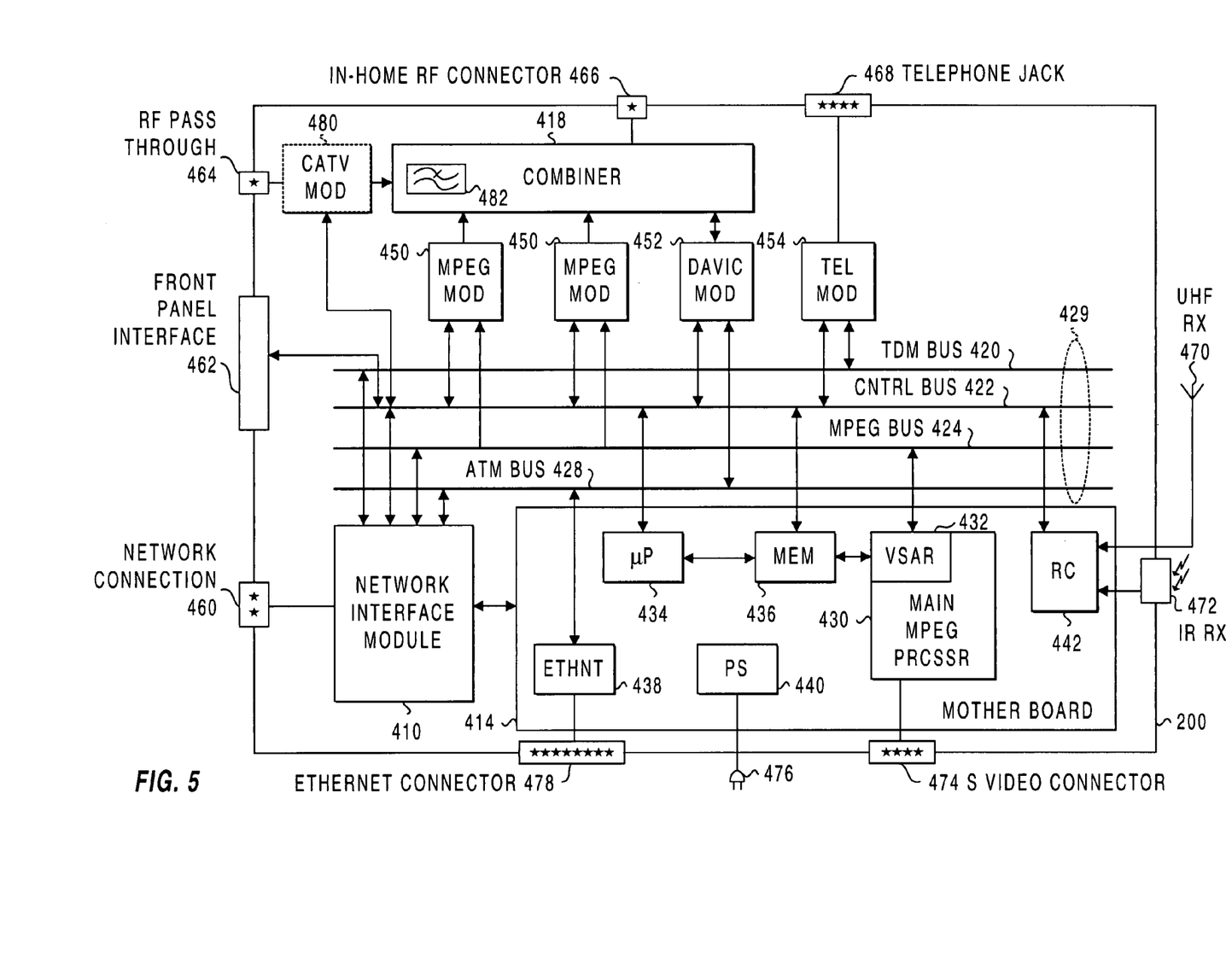
FIG. 5 illustrates an RG architecture, according to one embodiment.

FIG. 5 illustrates one embodiment of the RG 200. The RG 200 includes a network connection 460 for connecting to the digital network. The network connection 460 will vary depending on the digital network that the RG is connecting to. That is, the network connection 460 will depend on whether the digital network for the area the residence 190 is located within is an FTTC network, a DSL network, or other type of digital network. For example, if the drop line from the digital network to the RG 200 is a coaxial cable (i.e., the FTTC network of FIG. 3) the network connection 460 should be a coaxial cable connector. If the drop line from the digital network to the RG 200 is twisted wire pair cable (i.e., the DSL network of FIG. 4) the network connection 460 should be a connector capable of receiving twisted wire pairs, such as a telephone jack. As one skilled in the art would know, the network connection 460 could be various different types of connectors as long as the connector is capable of receiving the signals being transmitted over the drop line from the digital network.

The network connection 460 is connected to a Network Interface Module (NIM) 410. The NIM 410 receives all data from and transmits all data to the digital network and thus contains the appropriate modem technology. As with the network connection 460, the type of NIM 410 utilized depends on the type of digital network that the RG 200 is connected to (i.e., the FTTC network of FIG. 3, the DSL network of FIG. 4, or other types of digital networks). Regardless of the type of NIM 410 utilized, the NIM 410 interfaces to a mother board 414 which provides the basic functionality of the RG 200.

The mother board 414 may contain a microprocessor 434, memory 436, a power supply 440, a main MPEG processor 430, an Ethernet processor 438, and a Remote Control (RC) processor 442. As one skilled in the art would recognize, the mother board 414 could contain additional components, or some of the components illustrated as being part of the mother board 414 could removed from or located elsewhere within the RG 200, without departing from the scope of the current invention.

The RG 200 receives power from a power source, which in a preferred embodiment is an AC outlet, via a plug 476, which in a preferred embodiment is an AC plug. The power supply 440 converts the voltage from the AC outlet, for example 120 volts AC in a typical residence 190, to the voltages necessary for each of the components of the RG 200 to operate. The power supply 440 is illustrated as being an element of the mother board 414, but as one skilled in the art would know, the power supply 440 could be a separate component within the RG 200.

The microprocessor 434 controls the operation of the RG 200. For example, the microprocessor 434 may control the transfer of data between each of the elements of the RG 200. The memory 436 may store operating programs required by the microprocessor 434, data received from the digital network or any of the devices in the residence 190 connected to the RG 200, or other data or programs required by the RG 200.

The Ethernet processor 438 converts ATM cells received by the NIM 410 into the appropriate form for transmission to the devices, such as the computers 193. The computers 193 are connected to the RG 200 via an Ethernet connector 478 located in the housing of the RG 200. As illustrated in FIG. 5, the RG 200 has only one Ethernet connector 478. However, this is in no way intended to limit the current invention to an RG 200 that can only connect to one computer 193. That is, as one skilled in the art would know, multiple computers 193 could be connected to the RG 200 by using a splitter, adding Ethernet connectors 478 to the RG 200, or by other methods.

Within the main MPEG processor 430 there is a Video Segmentation and Re-assembly (VSAR) module 432 which constructs Motion Picture Experts Group (MPEG) packets from an ATM stream received from the NIM 410. In addition to constructing the MPEG packets, the VSAR module 432 can reduce jitter in the MPEG packets which arises from transmission of those packets over the ATM network 110, as well as constructing a useable MPEG stream in spite of lost ATM cells which contain partial MPEG packets. It would be obvious to one skilled in the art that the VSAR module 432 does not have to be part of the main MPEG processor 430. For example, the VSAR module 432 could be its own module on the mother board 414, could be its own subassembly, or could be part of another processor, such as the NIM 410.

While the VSAR module 432 has been described as constructing MPEG packets from received ATM streams, this is in no way intended to limit the scope of the invention. Rather, this is simply one of the preferred embodiments. That is, one preferred method for transmitting digital data over the digital network is in ATM streams, and one preferred method for encoding digital video data is an MPEG standard (currently the MPEG-2 standard). It is within the scope of the current invention to receive digital data from a digital network in any format and for the video data to be encoded in any format. That is, one skilled in the art could modify the VSAR module 432 to handle new transmission or encoding formats without departing from the scope of the current invention.

The main MPEG processor 430 can also decompress the MPEG packets, which are constructed by the VSAR module 432, to generate video signals compatible with present TVs 199. In one embodiment, the main MPEG processor 430 generates a video signal that has an S-video format. The S-video signal can be transmitted over an S-video connector 474 to a TV 199 having an S-video port via an S-video cable 205. As one skilled in the art knows, the S-video signals are a higher quality video signal because the chrominance and luminance information are separated. The TV 199 receiving the S-video signals should be located in close proximity to the RG 200 to ensure the quality of the S-video signal.

In one embodiment, the main MPEG processor 430 may decompress multiple MPEG packets corresponding to multiple TV channel selections. For example, the main MPEG processor 430 may decompress three video streams simultaneously to generate three video signals associated with three TV channel selections. The video signals are compatible with the current TV format, which in the U.S. is currently the National TV System Committee (NTSC) format. The invention however is not limited to the NTSC format. It is well within the scope of the current invention for the TV signals to be generated in accordance with the current standard for the time, whether it be the NTSC format or a new format. The TV signals may be combined and modulated over a single media or each TV signal may be modulated over its own media.

The RC processor 442 is capable of processing RC signals received by the RG 200. For example, in the embodiment illustrated in FIG. 5, the RC processor 442 receives optical signals from an optical receiver 472, such as an infrared (IR) receiver, and wireless signals from a wireless receiver 470, such as a UHF receiver, within the RG 200. One skilled in the art would recognize that the RC processor 442 could be designed to handle any type of channel select signals received by the RG 200.

Moreover, one skilled in the art would recognize that the RC processor 442 is not limited to the illustrated configuration of being a module located on the mother board 414. For example, the RC processor 442 could be located on another board or could be incorporated as part of another module.

The embodiment of the RG 200 illustrated in FIG. 5, further includes the optical receiver 472. The optical receiver 472 receives channel select commands from an optical RC associated with the TV 199 that is in close proximity to the RG 200, and in a preferred embodiment is directly connected to the RG 200 via the S-video port 474. In a preferred embodiment, the RG 200 is treated like a VCR and is either located in a stereo cabinet with the TV 199 or on top of the TV 199. As with a VCR, the TV 199 would be set to a particular channel, for example channel 3 or 4 just like a VCR, and the control of the channel selection for the TV 199 would then be controlled by the optical RC sending channel select commands to the RG 200 directly.

The embodiment of the RG 200 illustrated in FIG. 5, further includes the wireless receiver 470 for receiving channel select signals from the remotely located TVs 199 (i.e., located in separate rooms or even separate floors of the residence 190). The remotely located TVs 199 would be set to a particular channel, for example channel 3 or 4 just like a VCR, and the channel selection for the remotely located TVs 199 would then be controlled by a wireless RC associated with each remotely located TV 199. The wireless RC transmits the channel select commands directly to the wireless receiver 470 within the RG 200.

Figure 6:
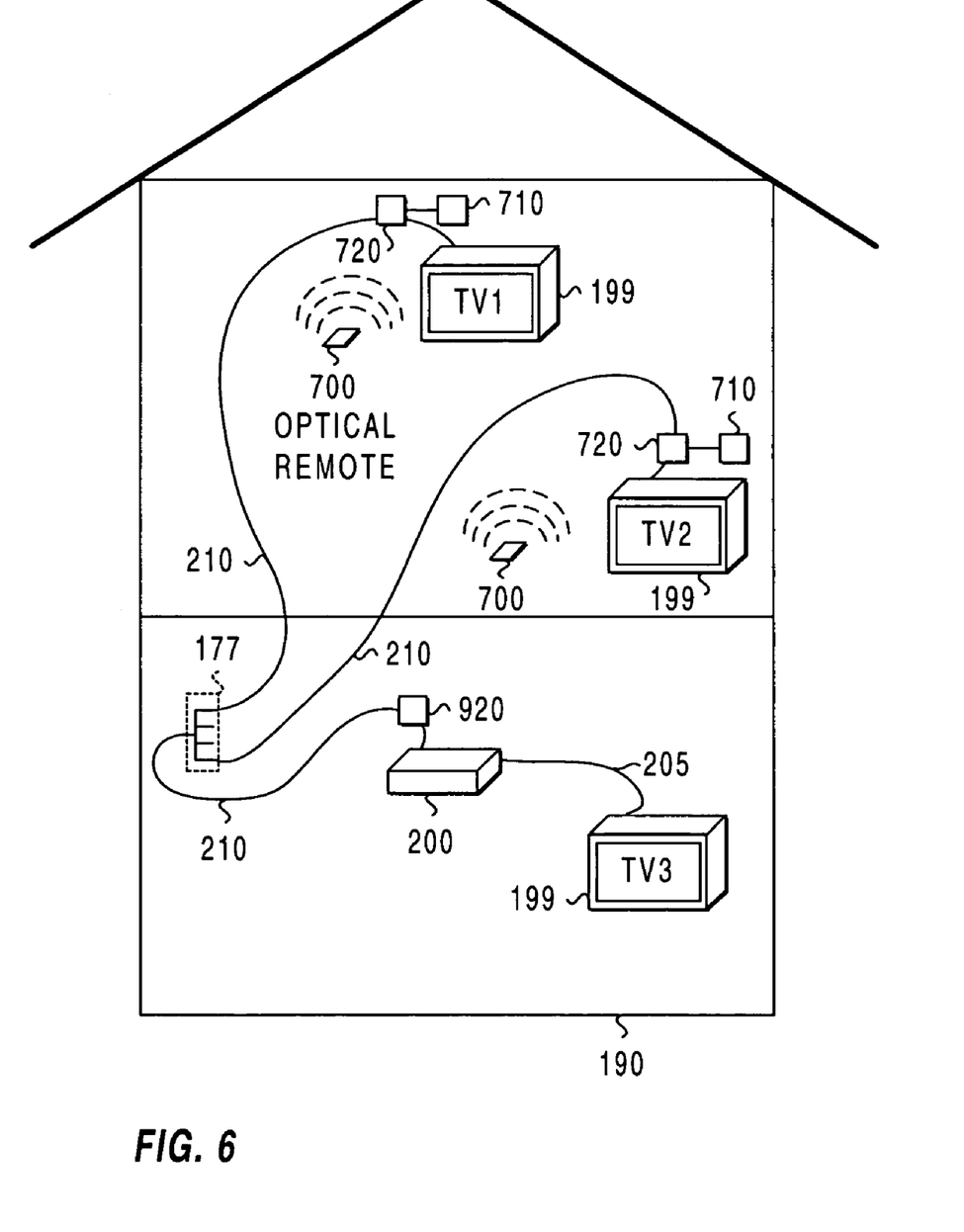
FIG. 6 illustrates the use of the RG with the residence, according to one embodiment.

The RG 200 also includes a set of buses 429 used to route information within the RG 200. As illustrated in FIG. 6 the set of buses 429 includes a Time Division Multiplexing (TDM) bus 420, a control bus 422, a MPEG bus 424, and an ATM bus 428.

The RG 200 may also include a number of optional modules which can be inserted into the RG 200. The optional modules include MPEG modules 450, a Digital Audio Visual Council (DAVIC) module 452, and a telephony module 454. All of the optional modules are connected to the control bus 422 in addition to being connected to at least one other bus which provides those modules with the appropriate types of data for the services supported by the module.

The MPEG modules 450 provide for decompression of MPEG packets which are constructed by the VSAR processor 432. The MPEG modules are associated with remotely located TVs 199. As with the output of the main MPEG processor 430, the output of the MPEG modules 450 is a signal having a format compatible with present TVs 199. The MPEG modules 450 can modulate the decompressed analog format video signal onto an available channel for transmission to the remotely located TVs 199 in the residence 190. In a preferred embodiment, the MPEG modules 450 are insertable cards. Thus, the cards could be added after an initial installation to handle additional TVs 199. For example, in one embodiment the main MPEG processor 430 may be capable of generating three TV signals so that the RG 200 can accommodate three TVs 199 without the need for any MPEG modules 450. If a fourth TV 199 was added, or one of the TVs 199 had picture-in-picture, a MPEG module 450 would be required to generate a fourth TV signal.

The DAVIC module 452 is for communicating with devices that have a signal format that is compatible with a signal format received from the digital network. That is, the DAVIC module transmits ATM signals to and receives ATM signal from these devices. Thus, the DAVIC module 452 allows the RG 200 to act as a pass through for these devices. These devices may include the interface sub-systems illustrated in FIGS. 1 and 2. This is beneficial because the RG 200 can be used in conjunction with previously purchased interface sub-systems if required or desired.

As illustrated in FIG. 5, the MPEG modules 450 and the DAVIC module 452 are connected to a combiner 418 which combines the RF signals from those modules. It should be noted that this embodiment has only one RF connector 466 so that the combiner 418 is necessary to combine all the TV signals and ATM signals so they can be transmitted over the media 210 connected to the RF connector 466. If multiple RF connectors 466 were provided, the combiner 418 could be located externally or not be required. However, the combiner 418 can also add other RF signals, such as off-air broadcast television signals or Community Antenna Television (CATV) signals supplied by a cable television company. Signals from the antenna or cable system are coupled to the RF pass-through 464, which in a preferred embodiment is an F-connector. A low pass filter 482 is used in the combiner 418 to insure that the frequencies used by MPEG modules 450 are available. The output of the combiner 418 is connected to the RF connector 466, which in a preferred embodiment is an F-connector.

An optional CATV module 480 can be inserted into the RG 200 to allow for mapping of off-air or cable video channels from their original frequencies to new frequencies for in-home distribution. The RC processor 442 can control the channel selection and mapping via the control bus 422 which is connected to the CATV module 480. Either a hand-held optical RC or a wireless RC can be used to change the channel mapping of the CATV module 480.

The RG 200 includes a front panel interface 462, which provides for connectivity between the front panel controls (buttons) and the microprocessor 434. Through the front panel controls, the user can make channel changes as well as changing the configuration of the channels transmitted on the in-home coaxial network.

The RG 200 also includes a telephony module 454, which transmits and receives information from the TDM bus 420 and produces an analog telephone signal which is compatible with telephones 194. The interface for the telephones 194 is a telephone jack 468, which in a preferred embodiment is an RJ-11 jack.

FIG. 6 illustrates an embodiment in which the wireless signals are not received by a wireless antennae within the RG 200. It is advantageous to have an alternative to the antennae of the wireless receiver 470, because depending on the distance between the RG 200 and the remotely located TVs 199, and the obstacles therebetween, the wireless signal carrying the channel select commands may be distorted or lost in transmission. In this embodiment, each remotely located TV 199 has a optical receiver 710, such as an IR receiver, connected to and located on or within close proximity to the TV 199. A user selects a channel by using an optical RC 700, such as an IR RC, associated with the optical receiver 710 to select a channel for the respective TV 199. The optical RC 700 transmits the channel select commands as optical signals to the optical receiver 710. The optical receiver 710 converts the optical signal to a pulse train. This type of optical receiver 710 is well known to those skilled in the art. The pulse train from the optical receiver 710 is then provided to a RF transmitter 720. The RF transmitter 720 converts the pulse train into a RF signal having a standard wireless frequency, which would be known to those skilled in the art. In a preferred embodiment, the frequency of the RF signal is approximately 433 MHz. The RF transmitter 720 then transmits the RF signal to the RG 200 over the media 210.

Figure 7:
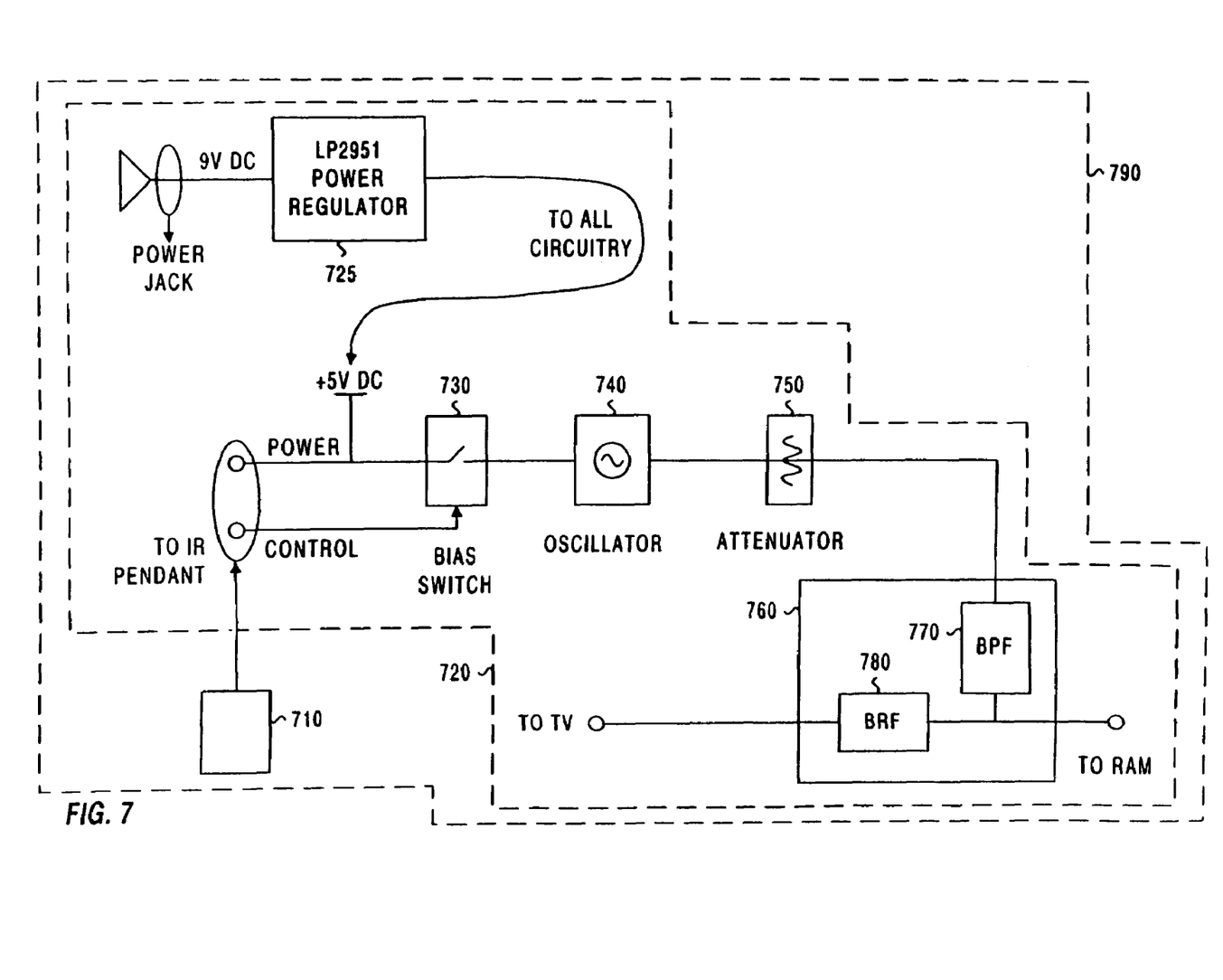
FIG. 7 illustrates the components of an RF transmitter, according to one embodiment.

FIG. 7 illustrates one embodiment of the RF transmitter 720. The RF transmitter 720 requires power in order to operate and is therefore provided with a plug that can plug into a standard outlet. As one skilled in the art would know, the RF transmitter 720 could include a battery that would provide the necessary power in lieu of the plug. The RF transmitter 720 includes a power regulator 725 which converts the received power to the power necessary to operate the RF transmitter 720, for example 5V. The RF transmitter 720 receives the pulse train from the optical receiver 710 and the necessary power from the power regulator 725 at a bias switch 730. The pulse train controls the operation of the bias switch 730. That is, the pulse train controls when the bias switch 730 is on and when it is off. An oscillator 740, such as a SAW resonator stabilized oscillator, is coupled to the bias switch 730. As such, the bias switch 730 controls when power is provided to the oscillator 740 and thus controls the generation of the RF signal by the oscillator 740.

An attenuator 750 is connected to the output of the oscillator 740 for reducing the amplitude of the RF signal to an appropriate level. The output of the attenuator 750 is connected to a diplexer 760 for directionally inserting the RF signal onto the media. That is, the diplexer 760 ensures that the RF signal is transmitted over the media to the RG 200 and not toward the remotely located TV 199 that is also connected to the RF transmitter 720. The diplexer 760 may consist of several filters such as a band pass filter (BPF) 770 and a band reject filter (BRF) 780. In the downstream direction, the BPF 770 allows the RF signal to pass through and be transmitted in the direction of the RG 200, while the BRF 780 ensures that the RF signal is not provided to the TV 199. In the upstream direction, the BRF 780 allows the TV signal to pass through and be transmitted to the TV 199, while the BPF 770 ensures that the TV signal is not provided to the rest of the RF transmitter 720 or the optical receiver 710.

As illustrated, the optical receiver 710 and the RF transmitter 720 are separate components. However, as one skilled in the art would recognize it is well within the scope of the current invention to combine the optical receiver 710 and the RF transmitter 720 into a single device. That is, an optical conversion device 790, such as optical to RF conversion device, could include the optical receiver 710, the power regulator 725, the bias switch 730, the oscillator 740, the attenuator 750 and the diplexer 760. While the optical conversion device 790 was just described as a combined unit, it is also intended to be a generic name that identifies the process being performed, whether it is the combined embodiment, the embodiment where the optical receiver 710 and RF transmitter 720 are separate, or an equivalent embodiment.

Figure 8A:
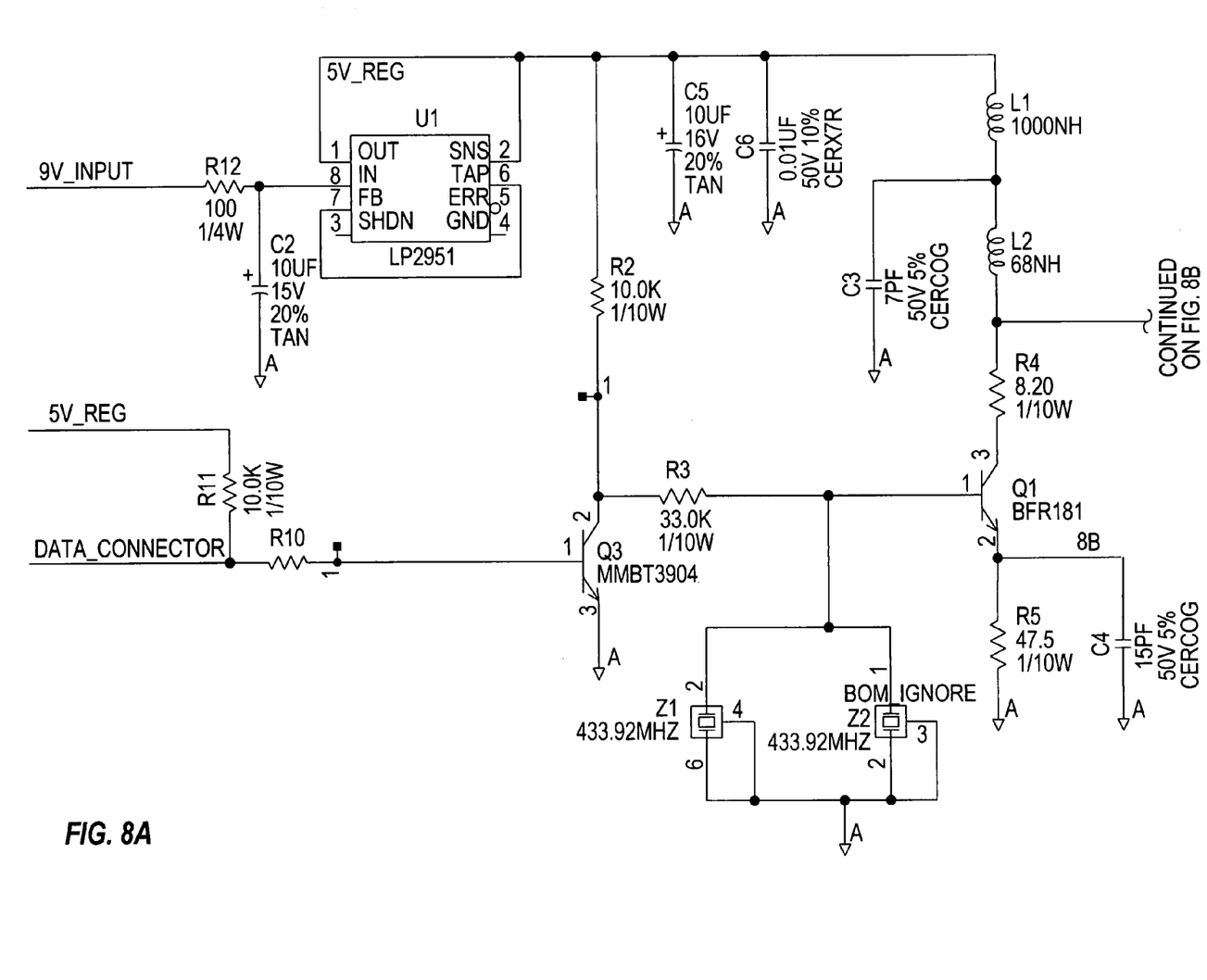
FIG. 8 illustrates a circuit diagram of the RF transmitter, according to one embodiment.
Figure 8B:
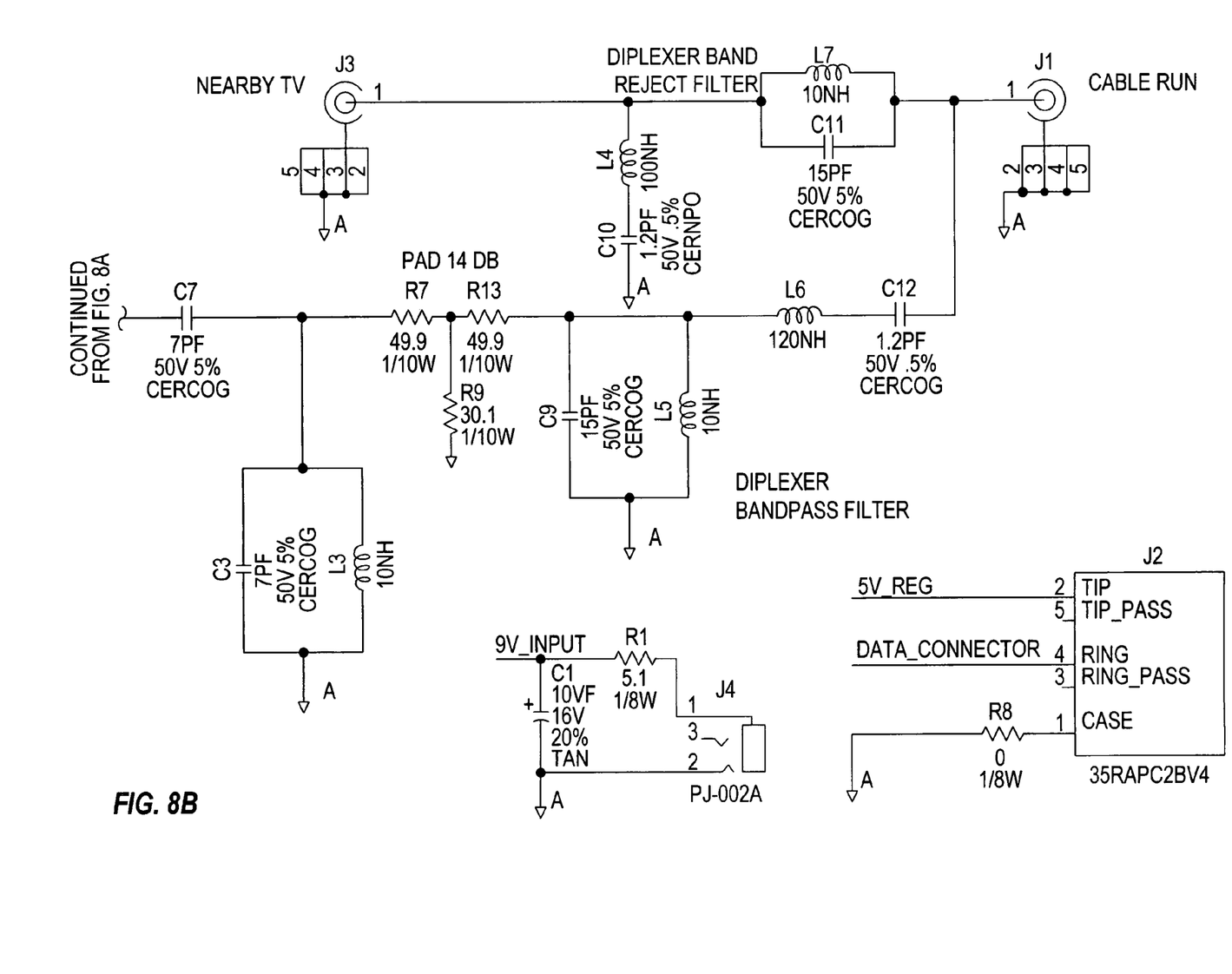

FIG. 8 illustrates a circuit diagram of one possible embodiment of the RF transmitter 720. It should be noted that this is simply one embodiment and is in no way intended to limit the scope of the invention.

The RF transmitter 720 (or optical conversion device 790) transmits the RF signal over the media 210, such as coaxial cable. The RF signal is received by a Remote Antennae Module (RAM) 920 which is connected to the RG 200. The RAM 920 demodulates the RF signal and extracts the portion of the signal corresponding to the channel select commands. For example, the RAM may extract the 1 KHz signal (i.e., audio signal) from the RF signal, wherein the 1 KHz signal corresponds to the channel select commands. The RAM 920 provides the channel select commands to the RG 200. The RAM 920 may transmit the channel select commands to the RG 200 over audio cables (i.e. speaker wire). Other alternatives include directly connecting the RAM 920 to the RG 200 or incorporating the RAM 920 into the RG 200.

Figure 9:
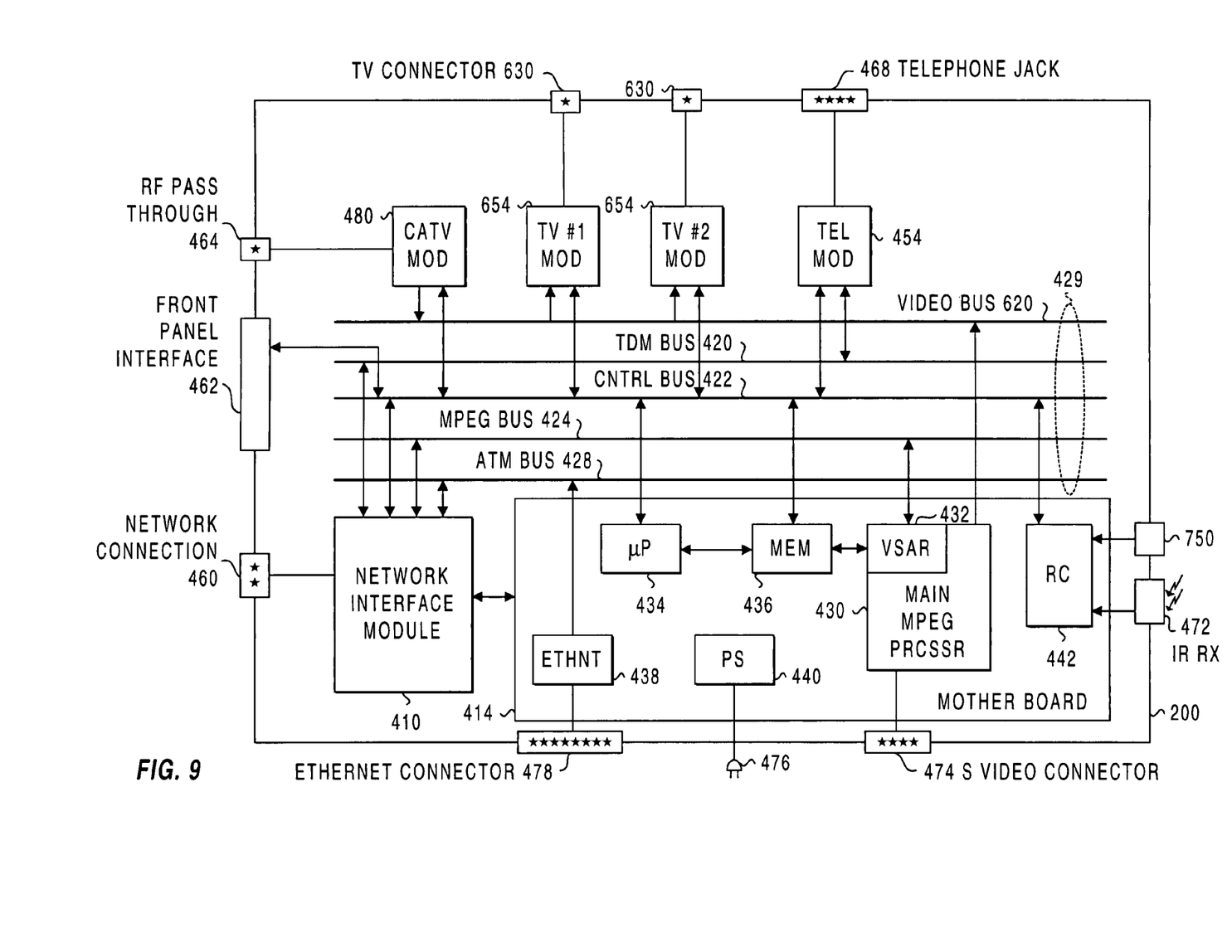
FIG. 9 illustrates an RG architecture, according to one embodiment.

FIG. 9 illustrates an embodiment of the RG 200 that includes a port 750 for receiving channel select commands from the RAM 920. The channel select commands are provided directly to the RC processor 442. In this embodiment, a wireless antennae is not required to receive the wireless signals. Moreover, this embodiment includes multiple ports 630, such as TV connectors. Thus, the combiner 418 of FIG. 5 is not required. Rather, this embodiment illustrates TV modules 654 for modulating the appropriate video channel over the appropriate port 630.

It may be beneficial to transmit multiple signals, including network signals, in addition to the TV signals and the RF signals over the media 210, such as a coaxial cable. When the network signals are to be transmitted over the media 210, a pair of diplexers are required. A first diplexer is required at a location where the network signals enter the residence 190 on the twisted wire pair cables, (i.e., remotely located from the RG 200). The first diplexer allows the downstream network signals to be transmitted over the media 210 and extracts the upstream signals from the media 210. The second diplexer is required in close proximity to the RG 200 so that the network signals can be transmitted to and from the RG 200 over twisted wire pair cables or the equivalent. The second diplexer extracts the downstream network signals from the media 210 prior to the media connecting to the RAM 920 and transmits the upstream signals on the media 210. In addition to the diplexers, baluns are required to adjust the impedance of the signals so they can be transmitted over the different media.

The RAM 920, the second diplexer and the second balun are all located in close proximity to the RG 200 and all require connectors to each other or the RG 200. Thus, in one embodiment, a Media Interface Device (MID) is provided that contains the RAM 920, the second diplexer, the second balun, and all the necessary connections. The MID can be designed so as to connect directly to the RG 200.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. An optical conversion device for receiving optical signals, converting the optical signals to RF signals, and transmitting the RF signals over media, the optical conversion device comprising:

an optical receiver for detecting the optical signal and generating a corresponding pulse train;

a bias switch connected to said optical receiver, said bias switch turning on and off solely in response to the pulse train;

an oscillator connected to said bias switch for producing a modulated RF signal, the modulated RF signal being produced by said oscillator turning on and off in response to said bias switch; and a diplexer filter for directionally injecting the RF signal onto the media.

2. The optical conversion device of claim 1, further comprising an attenuator connected between said oscillator and said diplexer for reducing the amplitude of the RF signal.

3. The optical conversion device of claim 1, wherein the optical conversion device is connected to a television and receives optical signals corresponding to channel select commands associated with the television from a corresponding remote control device.

4. The optical conversion device of claim 3, wherein said diplexer filter injects the RF signal onto the media in the direction of the direction of a residential gateway that controls communications between the television and a telecommunications network.

5. The optical conversion device of claim 1, wherein the media is a coaxial cable.

6. An optical conversion device for receiving optical signals representing channel select commands from an optical remote control device associated with a television, converting the optical signal to an RF signal, and transmitting the RF signal over media to a residential gateway, the optical conversion device comprising:

an optical receiver for detecting the optical signal and generating a corresponding pulse train;

a bias switch connected to said optical receiver, said bias switch turning on and off solely in response to the pulse train;

an oscillator connected to said bias switch for producing a modulated RF signal, the modulated RF signal being produced by said oscillator turning on and off in response to said bias switch; and a diplexer filter for injecting the RF signal onto the media in the direction of the residential gateway.

7. The optical conversion device of claim 6, further comprising an attenuator connected between said oscillator and said diplexer for reducing the amplitude of the RF signal.

* * * * *